United States Patent
Hassanzadeh et al.

(10) Patent No.: US 10,380,187 B2
(45) Date of Patent: Aug. 13, 2019

(54) SYSTEM, METHOD, AND RECORDING MEDIUM FOR KNOWLEDGE GRAPH AUGMENTATION THROUGH SCHEMA EXTENSION

(71) Applicant: International Business Machines Corporation, Armonk, NY (US)

(72) Inventors: Oktie Hassanzadeh, Port Chester, NY (US); Oliver Lehmberg, Mannheim (DE); Mohammad Sadoghi Hamedani, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 767 days.

(21) Appl. No.: 14/927,712

(22) Filed: Oct. 30, 2015

(65) Prior Publication Data

US 2017/0124217 A1     May 4, 2017

(51) Int. Cl.
*G06F 16/36*     (2019.01)
*G06F 16/901*     (2019.01)

(52) U.S. Cl.
CPC .......... *G06F 16/9024* (2019.01); *G06F 16/36* (2019.01)

(58) Field of Classification Search
CPC .............................. G06F 16/36; G06F 16/9024
See application file for complete search history.

(56) References Cited

U.S. PATENT DOCUMENTS

| | | | |
|---|---|---|---|
| 8,949,242 B1 * | 2/2015 | Lin | G06F 17/30731 707/739 |
| 9,672,251 B1 * | 6/2017 | Whang | G06F 17/30528 |
| 2013/0212081 A1 * | 8/2013 | Shenoy | G06F 17/30657 707/706 |
| 2013/0238621 A1 * | 9/2013 | Ganjam | G06F 17/30864 707/737 |
| 2014/0358539 A1 * | 12/2014 | Rao | G10L 15/063 704/243 |

* cited by examiner

*Primary Examiner* — Richard L Bowen
(74) *Attorney, Agent, or Firm* — Rahan Uddin, Esq.; McGinn IP Law Group, PLLC (57) ABSTRACT

A method, system, and recording medium for knowledge graph augmentation using data based on a statistical analysis of attributes in the data, including mapping classes, attributes, and instances of the classes of the data, indexing semantically similar input data elements based on the mapped data using at least one of a label-based analysis, a content-based analysis, and an attribute-based clustering, and ranking the semantically similar input data elements to create a ranked list.

19 Claims, 7 Drawing Sheets

KNOWLEDGE GRAPH 106

| company | country |
|---|---|
| at&t | united states |
| bp | united kingdom |
| procter & gamble | united states |
| wal-mart stores | united states |
| bhp billiton | australia/united kingdom |
| nestlé | switzerland |

FIRST DATA 105A

| rank | company | industry | profits(billion $) | assets(billion $) | market value(billion $) |
|---|---|---|---|---|---|
| 1 | citigroup | banking | 31.54 | 1884.32 | 247.42 |
| 2 | bank of america | banking | 21.13 | 1459.74 | 226.61 |
| 3 | hsbc | banking | 16.63 | 1860.76 | 202.29 |
| 4 | general electric | conglomerate | 20.83 | 697.24 | 358.98 |
| 5 | jpmorgan chase & co | banking | 14.44 | 1351.52 | 170.97 |

SECOND DATA 105B

| industry | company | video uses |
|---|---|---|
| telecoms | at&t inc | new products video share |
| institutional and retail banking | bank of america | new products commercials |
| aerospace & defense | boeing co | plane virtual tours first flights carrier takeoffs and landings |
| commercial vehicles & trucks | caterpillar inc | product commercials |
| oil and gas | chevron corp | technology overview corporate news |
| banks | citigroup inc | community videos |

THIRD DATA 105C

| company | country | industry | sales ($bil) | profits | assets | market value |
|---|---|---|---|---|---|---|
| petrochina | china | oil & gas operations | 88.24 | 19.21 | 111.7 | 546.14 |
| exxonmobil | united states | oil & gas operations | 358.6 | 40.61 | 242.08 | 465.51 |
| general electric | united states | conglomerates | 172.74 | 22.21 | 795.34 | 330.93 |
| china mobile | hong kong/china | telecommunications services | 37.06 | 8.29 | 62.44 | 306.59 |

FIG. 4

| Conditional | Consistency | Coherency | Trust + Conditional |
|---|---|---|---|
| Industry (3) | Industry (3) | Sales (1) | Industry (3) |
| Profits (2) | Profits (2) | Industry (3) | Profits (2) |
| Assets (2) | Assets (2) | Profits (2) | Assets (2) |
| market value (2) | market value (2) | Assets (2) | market value (2) |
| Rank (1) | Sales (1) | market value (2) | Rank (1) |
| Video Uses (1) | Rank (1) | Rank (1) | Sales (1) |
| Sales (1) | Video Uses (1) | Video Uses (1) | Video Uses (1) |

SYSTEM, METHOD, AND RECORDING MEDIUM FOR KNOWLEDGE GRAPH AUGMENTATION THROUGH SCHEMA EXTENSION

BACKGROUND

The present invention relates generally to knowledge graph augmentation, and more particularly, but not by way of limitation, to a system, a method, and a recording medium for extending a knowledge graph based on a large corpus of structured data.

Conventional techniques may rely only on labels in schema such as column headers, may use a single statistical measure to find relevant attributes, may rely on text surrounding or describing the structured source, and may rely on query logs and work only when a large user base is available.

Other conventional techniques may merely create an "Attribute Correlation Statistics Database" (AcsDb) which contains attribute counts based on the headers of the respective columns. From these counts, the conventional techniques estimate attribute occurrence probabilities. Applications for this database are a schema auto-complete function, synonym generation and a tool enabling easy join graph traversal for end-users. Such conventional techniques evaluate their Schema Auto-Complete system by giving both the system and a number of humans a single (key)attribute and ask them to create a schema, then measure to which extent the system can reproduce the schema created by the humans. The focus of the exemplary conventional techniques is to find names for possible attributes. The conventional techniques do not consider the content/values of these attributes and hence do not evaluate this aspect.

Other conventional techniques propose an integration of data using web tables, defined as an "EXTEND" operation. These techniques require the user to provide an input table and a keyword query. Based on the user provided input, these techniques attempt to determine one or multiple tables that can extend the input table with the topic given by the keyword query. These conventional techniques use a search engine to find the tables and different value-based matching approaches to determine which tables can be combined. However, the "EXTEND" operation is evaluated by issuing a number of queries in the form (e.g., input table, join key, topic of column to be added) and checking the number of correct values that are returned. As a new attribute is specified, there is no need for a ranking by usefulness. It is unclear in these conventional techniques how the column that contains the value is selected.

Other conventional techniques use label-based and value-based schema matching techniques to map web tables to a knowledge base. For these techniques "Schema Complement" operation, the techniques consider all unmapped columns and rank the unmapped columns using the "AcsDb" and the entity coverage of the input table provided by the user. The goal is to rank complete tables by their usefulness for the complement task. However, such conventional techniques evaluate their system by letting users decide how related the tables are in their output are. The focus is on the tables and not the attributes.

That is, the above conventional systems, and other conventional knowledge graph augmentation systems are limited in their application in that they make no claims about the content/values of these attributes and hence do not evaluate this aspect, it is unclear in these conventional techniques how the column that contains the value is selected, and the focus of such techniques is on tables, not attributes.

Thus, there is a technical problem in the conventional systems that the methods of knowledge graph augmentation rely either on additional sources (e.g., search engine query log) or perform only basic label-based analysis such that they do not adequately augment existing knowledge graphs with any efficiency.

SUMMARY

In an exemplary embodiment, the present invention can provide a method for knowledge graph augmentation using data based on a statistical analysis of attributes in the data, including mapping classes, attributes, and instances of the classes of the data, indexing semantically similar input data elements based on the mapped data using at least one of label-based analysis, content-based analysis, and attribute-based clustering, and ranking the semantically similar input data elements to create a ranked list.

Further, in another exemplary embodiment, the present invention can provide a non-transitory computer-readable recording medium recording a knowledge graph augmentation program using data based on a statistical analysis of attributes in the data, the program causing a computer to perform mapping classes, attributes, and instances of the classes of the data, indexing semantically similar input data elements based on the mapped data using at least one of label-based analysis, content-based analysis, and attribute-based clustering, and ranking the semantically similar input data elements to create a ranked list.

Even further, in another exemplary embodiment, the present invention can provide a system for knowledge graph augmentation using data based on a statistical analysis of attributes in the data, including a mapping device configured to map classes, attributes, and instances of the classes of the data, an indexing device configured to index semantically similar input data elements based on the mapped data using at least one of label-based analysis, content-based analysis, and attribute-based clustering, and a ranking device configured to rank the semantically similar input data elements to create a ranked list.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

The invention will now be described with reference to FIGS. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
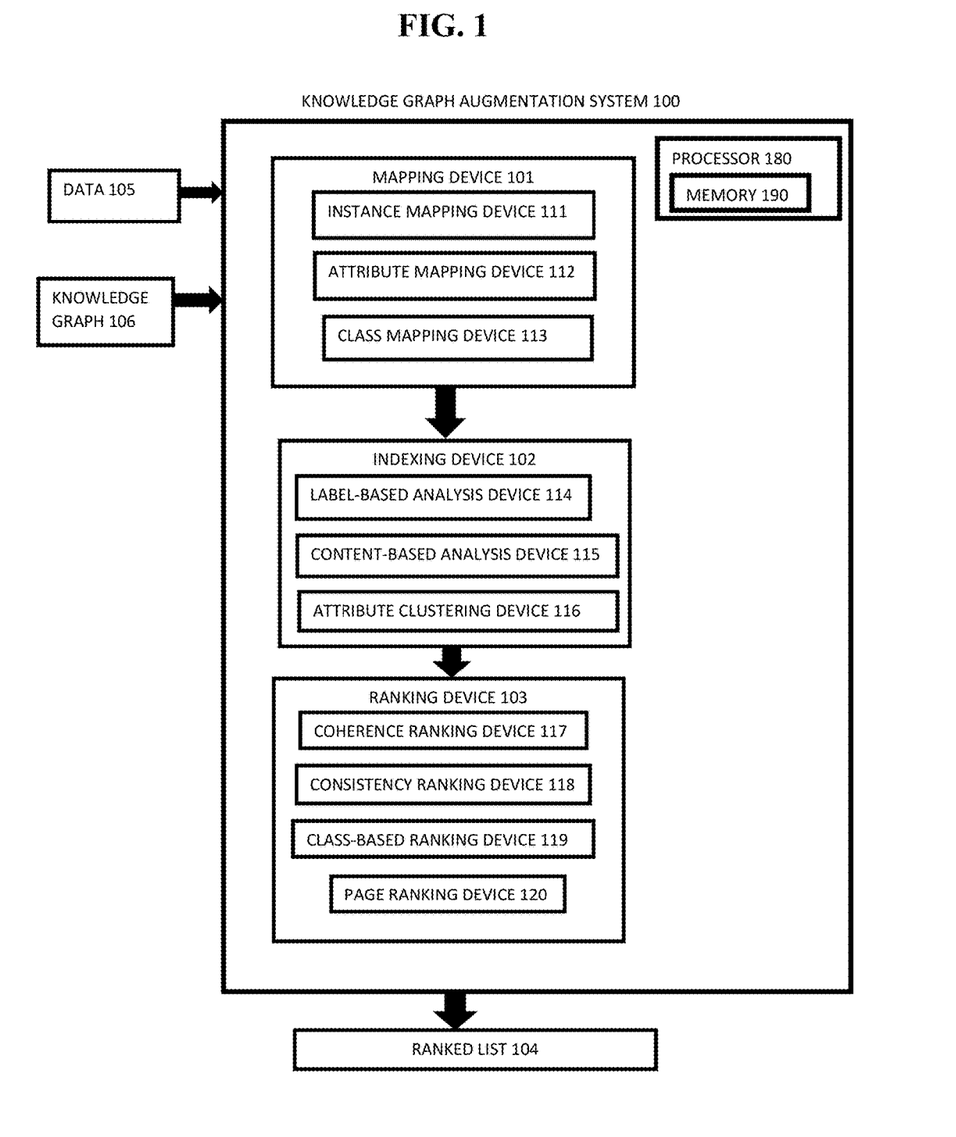
FIG. 1 exemplarily shows a block diagram illustrating a configuration of a knowledge graph augmentation system 100.

With reference now to FIG. 1, the knowledge graph augmentation system 100 includes a mapping device 101, an indexing device 102, and a ranking device 103. The knowledge graph augmentation system 100 includes a processor 180 and a memory 190, with the memory 190 storing instructions to cause the processor 180 to execute each device of the knowledge graph augmentation system 100.

Figure 5:
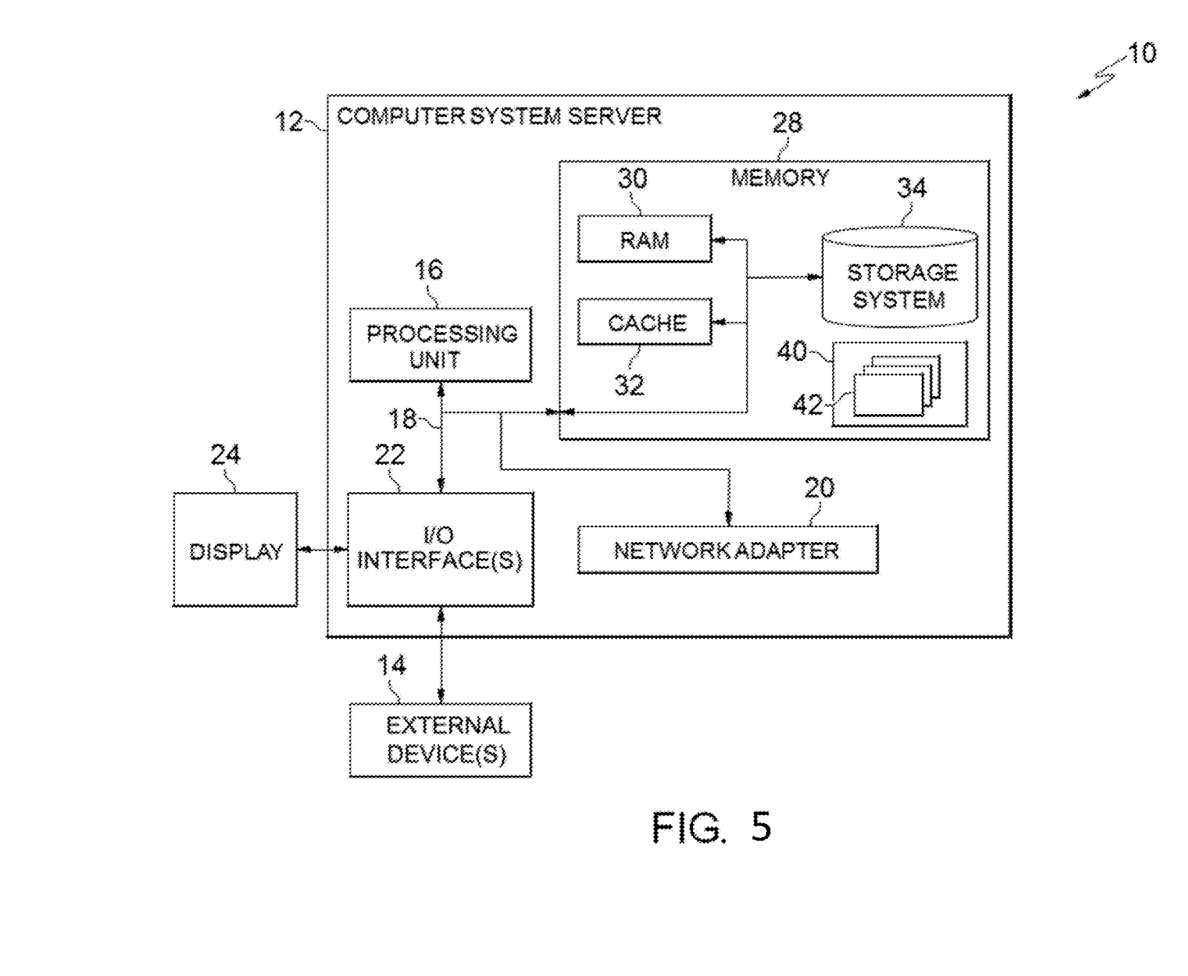
FIG. 5 depicts a cloud computing node according to an embodiment of the present invention.
Figure 6:
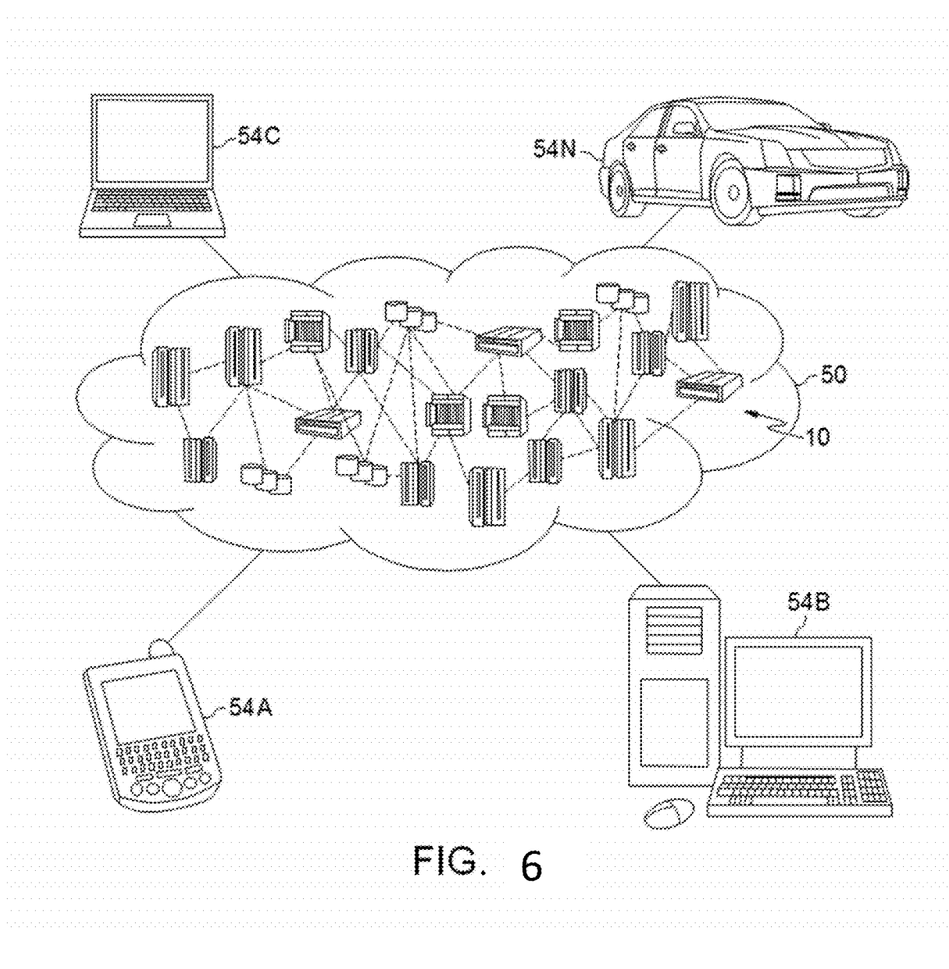
FIG. 6 depicts a cloud computing environment according to another embodiment of the present invention.
Figure 7:
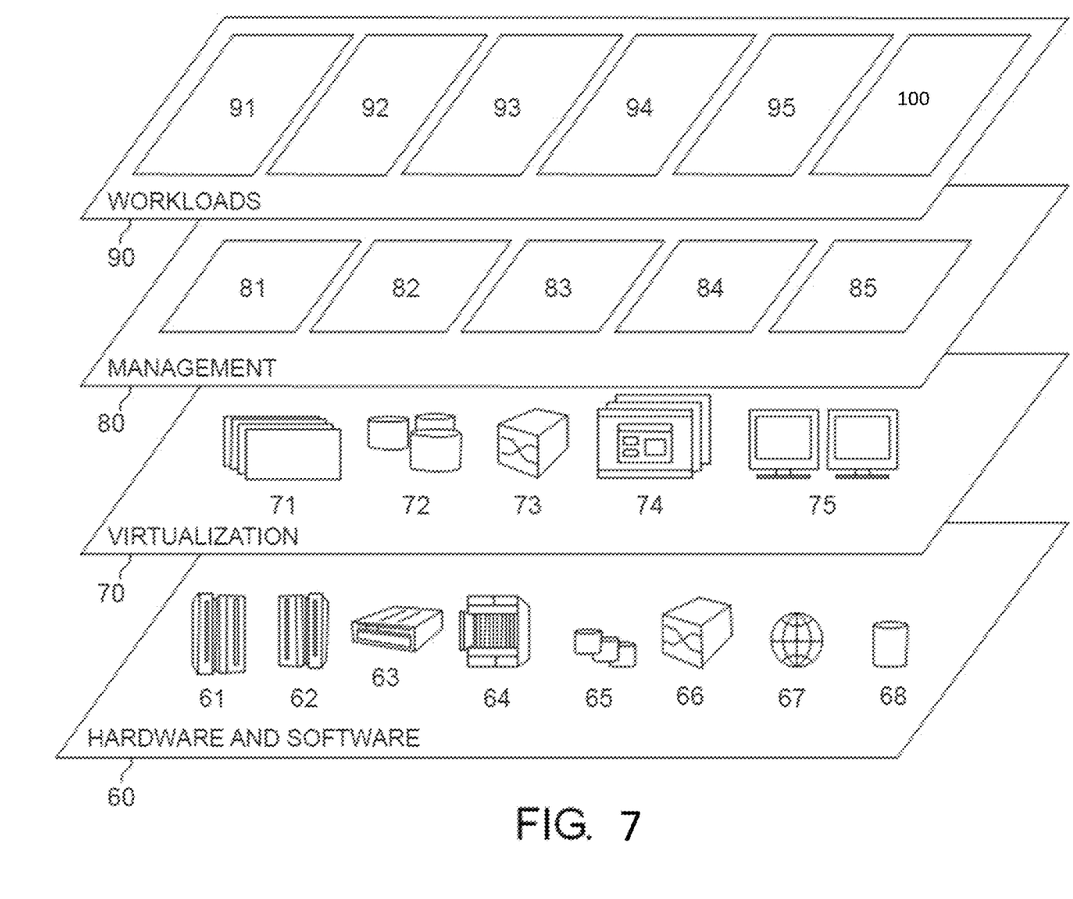
FIG. 7 depicts abstraction model layers according to an embodiment of the present invention.

Although as shown in FIGS. 5-7 and as described later, the computer system/server 12 is exemplarily shown in cloud computing node 10 as a general-purpose computing device which may execute in a layer of the knowledge graph augmentation system 100 (FIG. 7), it is noted that the present invention can be implemented outside of the cloud environment.

The knowledge graph augmentation system 100 receives data 105 (i.e., a corpus of structured data, a large database, comma separated files (CSV), etc.) and a knowledge graph 106. The knowledge graph 106 input into the knowledge graph augmentation system 100 includes an existing knowledge graph 106 that the knowledge graph augmentation system 100 augments (i.e., expands/adds values to) by adding missing values, extending the set of entities, and extending the schema such that the existing knowledge graph can be refined, extended, and/or adapted for new domains and applications. In other words, the knowledge graph augmentation system 100 builds/expands on an existing knowledge graph 106.

The mapping device 101 includes an instance mapping device 111, an attribute mapping device 112, and a class mapping device 113.

It should be noted that an "attribute" (or "label") described herein relates to a column heading, and the corresponding content associated with that attribute is a set of values of that attribute or label. For example, as exemplarily shown in FIG. 3, an exemplary attribute or label is "industry" in the second data 105B, with the corresponding set of values being telecoms, aerospace and defense, etc.

Further, it should be noted that "data" described herein relates to structured data, tables, comma separated files (CSV), etc. such that the knowledge augmentation system 100 can identify values within the data.

Based on the input knowledge graph 106, the class mapping device 113 sorts through the data 105 and identifies each table that includes a class of the knowledge graph 106. As exemplarily shown in FIG. 3, the class mapping device 113 receives the knowledge graph 106 and identifies that the first data 105A, the second data 105B, and third data 105C include the class of "country" or "company".

Figure 3:
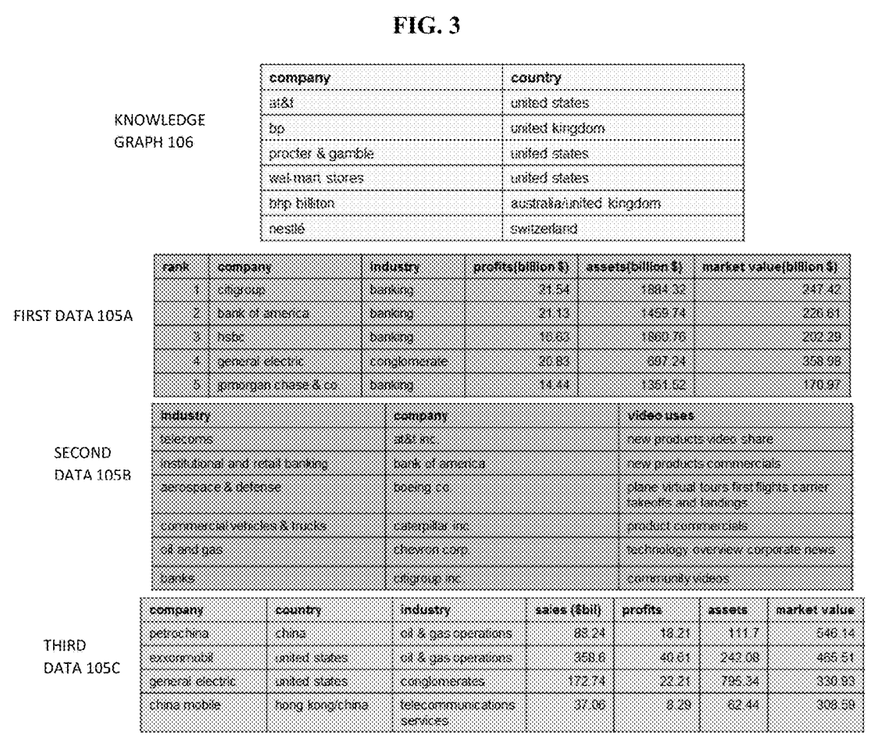
FIG. 3 exemplarily shows a knowledge graph 106 and data 105 input into the knowledge graph augmentation system 100 and method 200.

Thus, the class mapping device 113 identifies that the first data 105A, the second data 105B, and third data 105C are tables that are related to the knowledge graph 106.

The attribute mapping device 112 maps each of the attributes in the tables that the class mapping device 113 has identified to be associated with a class of the knowledge graph 106. Thus, the attribute mapping device 112 maps each attribute of each table that the class mapping device 113 has identified. More plainly stated, the attribute mapping device 112 maps the column heading of each of the columns of the tables (for example, the first data 105A, the second data 105B, and third data 105C) as attributes associated with the class in the knowledge graph 106.

The instance level mapping device 111 maps each instance of a value of the set of values within a class and the corresponding set of values associated with that value. As exemplarily shown in FIG. 3, the instance level mapping device 111 maps "Citigroup®" of the first data 105A as an instance of the class "company" and then associates the corresponding set of values with that instance of the class (i.e., banking, 21.54, 1884.32, 247.42).

Thus, the mapping device 101 maps each class, attribute, and instance of each class and outputs the mapped data to the indexing device 102.

The indexing device 102 includes a label-based analysis device 114, a content-based analysis device 115, and an attribute clustering device 116. The indexing device 102 indexes semantically similar input data elements using the label-based analysis device 114, the content-based analysis device 115, and the attribute clustering device 116.

The label-based analysis device 114 analyzes the headers of a column of the mapped data (i.e., the label/attribute of the column). The label-based analysis device 114 identifies each of the columns among the mapped data that have an exact match of their labels. The label-based analysis device 114 can also identify each of the columns among the mapped data that have a string similarity between the labels of the columns. For example, the label-based analysis device 114 can identify the column of the first data 105A having the label "industry" as being related to the column of the third data 105C having the matching label "industry".

The content-based analysis device 115 analyzes the set of values associates with each column of each of the data 105 and compares the values based on a column-to-column similarity.

For example, the content-based analysis device 115 can calculate a cosine similarity of the set of values between columns (i.e., column-to-column calculation) by converting the text to a vector and determining the closeness of each value of the set of values based on the cosine similarity. This calculation can be done according to known techniques of converting the set of values to a vector and calculating the cosine similarity between the vectors. Based on the cosine similarity between values, the content-based analysis device 115 determines how related the columns are to each other.

Even further, the content-based analysis device 115 can calculate a containment ratio between columns to determine the column-to-column similarity. The content-based analysis device 115 determines the amount of values of the set of values that match each other. For example, the content-based analysis device 115 can analyze the second data 105C and the third data 105C to find that three values of the third data 105C (i.e., "oil & gas operations", "oil & gas operations", and "telecommunications services") overlap with the values of the second data 105B such that there is a containment ratio of 3 out of 4 of the third data 105C in the second data 105B. Therefore, it is likely that the second data 105B and the third data 105C are related.

Also, the content-based analysis device 115 can index the data based on a key-value analysis. For example, after the instance mapping device 111 maps each instance of a value of the set of values within a class and the corresponding set of values associated with that value, if a first value of a column mapped within a first class matches the exact same first value of a second column mapped within a second class, the content-based analysis device will not index the values since they are not associated with the same key. In this manner, the content-based analysis device 115 performs key-value based matching of values.

In other words, the key-value analysis compares only those values of two columns, which are mapped to the same entity in the knowledge base. This means that two columns are equivalent only if they contain similar values for the same entities.

The attribute clustering device 116 clusters similar attributes. For example, assume that there are five attributes: "attr1", "attr2", "attr3", "attr4", "attr5" where "attr1", "attr2", and "attr3" have the same label "label1", "attr4" has label "label2", and "attr5" has label "label3". Also assume that there is a Boolean content-based similarity function simulation that indicates similarity between contents of attributes, (e.g., sim(attr1,attr2) means contents of "attr1" and "attr2" are similar).

Further, assume that there is sim(attr2, attr3), sim(attr2, attr4), and sim(attr4, attr5).

The label-based analysis device 114 will make three index items for the three labels: "i1" (label1): "attr1", "attr2", "attr3"; "i2" (label2): "attr4"; and "i3" (label3): "attr5". The label-based analysis device 114 assumes that "label1", "label2", and "label3" are not similar or that the label-based analysis device 114 is using exact label-based analysis. Or, the label-based analysis device 114 can index similar labels together, for example if "label2" and "label3" are similar, then "i2" and "i3" will be merged.

The content-based analysis device 115 will make the following index items "i1": "attr1"; "i2": "attr2", "attr3", "attr4"; and "i3": "attr4" and "attr5".

The attribute-based clustering device 116, performs a clustering of the attributes based on the content-based and/or label-based similarity. For example, if there is a graph where nodes represent attributes and edges represent content-based similarity of attributes, then the attribute-based clustering device 116 can use an existing graph clustering algorithm to perform this clustering. The most basic kind of graph clustering algorithm is graph partitioning ("partitioning clustering"). Using partitioning clustering in the above example merges "i2" and "i3" because the attribute-based clustering device 116 views the content-based similarity between attributes as a similarity graph, attributes "attr2", "attr3", "attr4", and "attr5" will all be in the same partition. Therefore, "i1": "attr1" and "i2": "attr2", "attr3", "attr4", and "attr5".

It should be noted that although "partitioning clustering" is exemplarily described as a graph clustering algorithm, the clustering is not limited thereto, and can include "partitioning", "center", and "merge-center" clustering.

It should be noted that "attr2" and "attr5" are now indexed together although sim(attr2,attr5) is not present (i.e., their contents are not directly similar).

The label-based analysis device 114, the content-based analysis device 115, and the attribute clustering device 116 can perform each of their respective functions individually or in any combination thereof. In a preferable embodiment, each of the label-based analysis device 114, the content-based analysis device 115, and the attribute clustering device 116 performs their respective functions in combination. However, each device can independently index the data in that at least one of the devices 114, 115, and 116 performs their function.

For example, if data is analyzed that has no headers, the label-based analysis device 114 may not perform its functions properly. Thus, the combination of devices 114, 115, and 116 can improve the output to the ranking device 103.

The indexing device 102 outputs the indexed tables of the data 105 to the ranking device 103.

The ranking device 103 includes a coherence ranking device 117, a consistency ranking device 118, a class-based ranking device 119, and a page ranking device 120.

Figure 4:
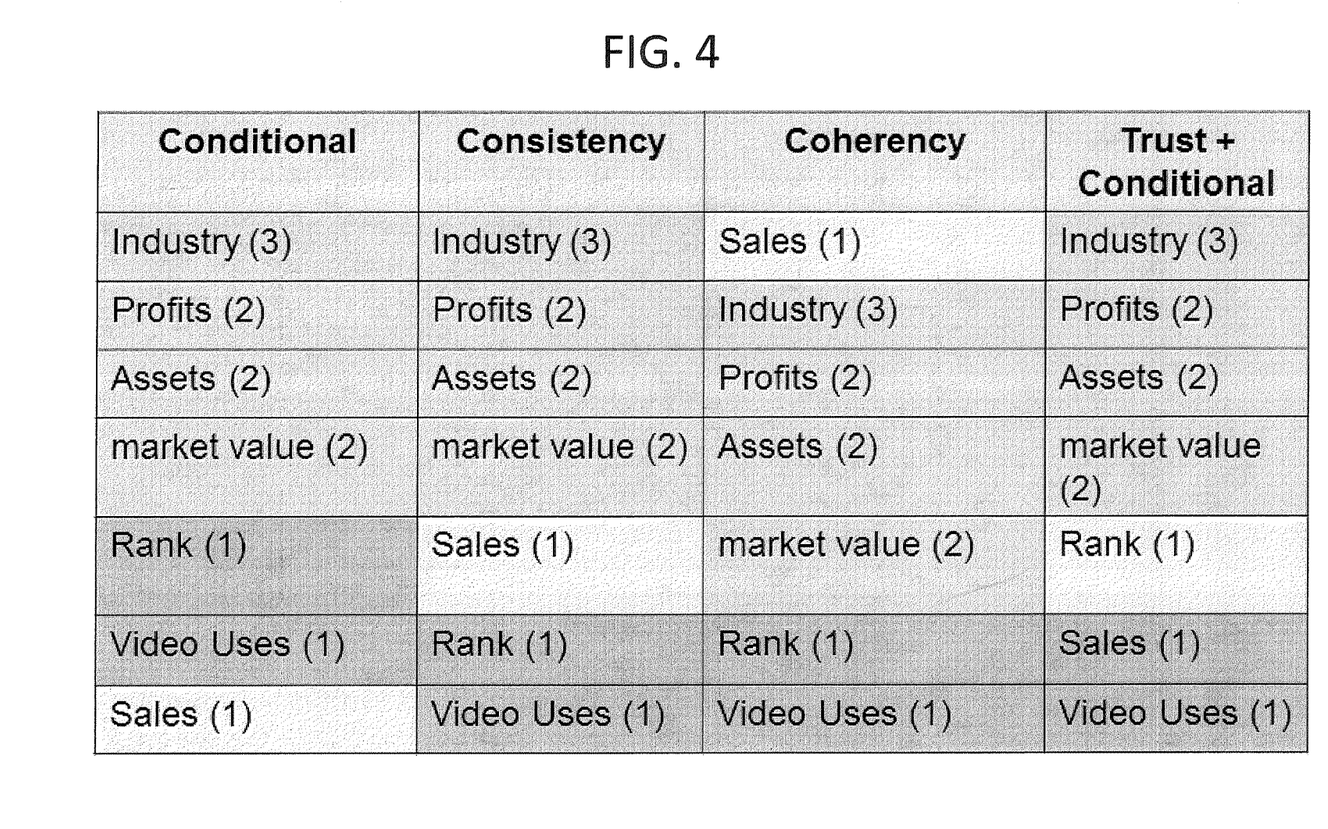
FIG. 4 exemplarily shows a ranked list 104 of by the knowledge graph augmentation system 100 and method 200.

FIG. 4 exemplarily shows an output of each of the device 117, 118, 119, and 120 (i.e., a ranked list 104). For example, the coherence ranking device 117 outputs the exemplary items in the column "Coherency", the consistency ranking device 118 outputs the exemplary items in the column "Consistency", the class-based ranking device 119 outputs the exemplary items in the column "Conditional", and the page ranking device 120 outputs the exemplary items in the column "Trust+Conditional". The outputs in each of the columns of FIG. 4 is exemplarily output based on the first data 105A, the second data 105B, and the third data 105C.

The ranking device 103 ranks the attributes that will be used to augment the knowledge graph input into the knowledge graph augmentation system 100. For example, the knowledge graph 106 input into the system 100 includes the attributes "company" and "country". Thus, the ranking device 103 will rank which attribute columns to augment the knowledge graph with using the four devices 117, 118, 119, and 120.

The coherence ranking device 117 ranks the attributes which co-occur with existing attributes of the knowledge graph 106 higher than the frequent ones. In other words, attributes that appear more frequently may be less interesting than an attribute that co-occurs with more existing attributes of the knowledge graph 106.

Therefore, as exemplary shown in FIG. 4, the coherence ranking device 117 ranks "sales" as the highest rank because it is determined to be more unique than industry since industry is seen more often and it co-occurs with both attributes in the knowledge graph 106.

The consistency ranking device 118 ranks the attributes of the tables of the data 105 based on the class information, the frequency of the attribute, and the co-occurrence with existing attributes of the knowledge graph 106. In other words, the more often an attribute occurs with an attribute that is already in the knowledge graph 106, the better the attribute may be to augment the knowledge graph 106.

Thus, as can be seen in FIG. 4 as compared with the class-based ranking device 119 output "ranks", "sales" is above "rank" and "video uses" since sales co-occurs with the attributes "company" and "country" in the third data 105C (i.e., attributes in the knowledge graph 106). That is to say, in an exemplary embodiment, it may be more likely that sales is relevant than the attributes of "rank" and "video uses".

The class-based ranking device 119 ranks the attributes of the tables of the data 105 based on the class information and the frequency of the attribute. In other words, the most frequent attributes in the tables of the data 105 may be the most relevant or interesting to augment the knowledge graph 106 with.

In other words, based on the mapping output by the indexing device 102 performed by at least one of the devices of the indexing device 102, each of the tables of data 105 are related to the knowledge graph by either containing a "company" or "country" attribute. The class-based ranking device 119 ranks each attribute of the tables of data 105 (i.e., the first data 105A, the second data 105B, and the third data 105C) based on the number of times that the attributes occurs.

For example, industry is in each of the three tables and has a highest rank by the class-based ranking device 119, "assets", "profits", and "market value" are in two of the three tables and has the second highest ranking (i.e., they are all tied for second highest) by the class-based ranking device 119, and "rank", "video uses", and "sales" has the lowest ranking (i.e., they are all tied for lowest) by the class-based ranking device 119.

The page ranking device 120, concurrently with at least one of the coherence ranking device 117, the consistency ranking device 118, and the class-based ranking device 119, ranks the attributes of the tables of the data 105 based on the source of where the data 105 was taken from (i.e., Wikipedia may be the highly ranked source of data 105, a blog may be a lower ranked source, etc.)

In an exemplary embodiment, the first data 105A may be derived from a source (i.e., web-page, crawled data, blog, etc.) that has a highest trust value, the second data 105B may be derived from a source that has a trust value lower than the first data 105A, and the third data 105C may be derived from a source page that has a trust value higher than the second data 105C but lower than the first data 105A.

Thus, as exemplarily shown in FIG. 4, if the page ranking device 120 is combined with the ranks output by the class-based ranking device 119, "sales" moves above "video uses" since "sales" is in a higher trusted source (i.e., the third data 105C) than "video uses" (i.e., the second data 105B).

The ranking device 103 ranks the attributes of the data 105 using at least one of the coherence ranking device 117, the consistency ranking device 118, the class-based ranking device 119, and the page ranking device 120, or any combination thereof.

The ranking device 103 outputs a ranked list 104 as exemplarily shown in FIG. 4. Each of the columns of the ranked lists can be weighted and combined so as to output one ranked list. For example, if the coherence ranking device 117 outputs rankings that are 80% accurate and the class-based ranking device 119 outputs rankings that are only 5% accurate, the rankings can be combined by taking into account the accuracy of the rankings by weighting each column of the ranked list 104 and performing averaging to output a single list (i.e., merge each ranked column together into one ranked list).

For example, the weights could be associated with the current number of each item in the ranked list. That is, "industry" appears first in three of the ranked lists and second in the other. Thus, "industry" could have a weighted score of 1.25 (i.e., (1+1+2+1)/4) and "market value" could have a weighted score of 4.25 (i.e., (4+4+5+4)/4). This can be done for each of the attributes output from the ranking device 103 to calculate a merged ranked list.

Of course, other rankings and/or weightings can be performed based on other criteria (i.e., age/date of the data source in which newer data sources are deemed more reliable, etc.)

Figure 2:
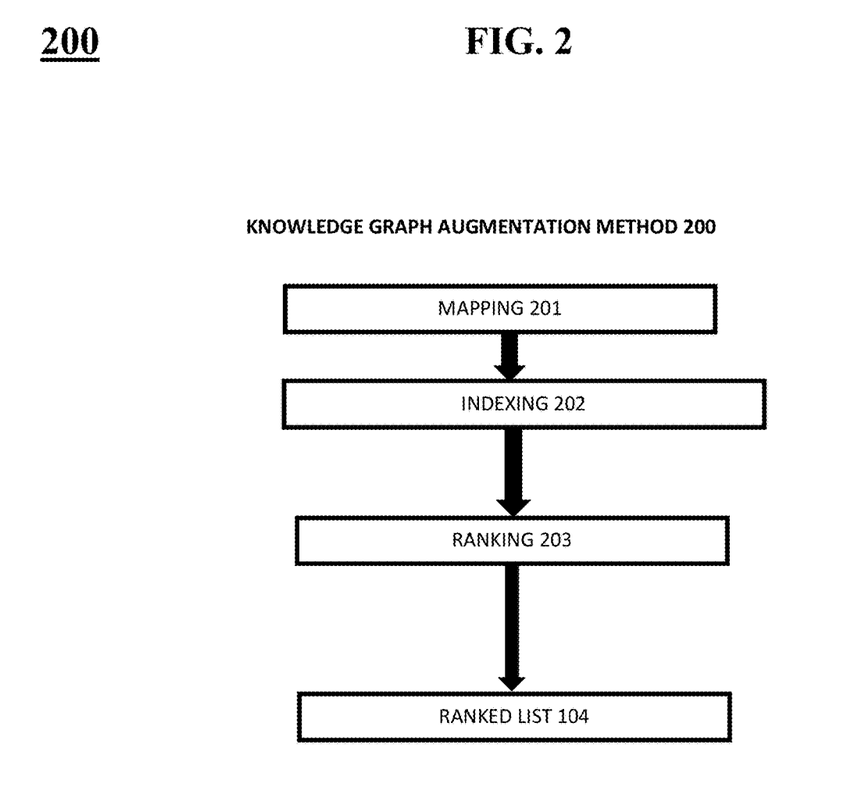
FIG. 2 exemplarily shows a high level flow chart for a knowledge graph augmentation method 200.

FIG. 2 shows a high level flow chart for a knowledge graph augmentation method 200 that receives data 105 and a knowledge graph 106 as an input.

Step 201 maps each class, attribute, and instance of each class of the data 105 and outputs the mapped data 105 to the indexing step 202.

Step 202 indexes the map data by analyzing the headers of a column of the mapped data to identifies each of the columns together amongst the mapped data that have an exact match of their labels, identify each of the columns amongst the mapped data that have a string similarity between the labels of the columns, compare the values based on a column-to-column similarity (i.e., calculate a cosine similarity of the set of values between columns, calculate a containment ratio between columns to determine the column-to-column similarity, etc), and/or cluster the set of values of the attributes together based on an overlap between corresponding attributes.

Step 203 receives the indexed data 105 from the indexing 202 and ranks the data 105 based on coherence ranking, consistency ranking, class-based ranking, and/or page-based ranking to output a ranked list 104.

In view of the foregoing and other problems, disadvantages, and drawbacks of the aforementioned conventional techniques, it is desirable to provide a new and improved knowledge graph augmentation system, method, and non-transitory recording medium that, given a large corpus of structured data (e.g., millions of CSV files, or a large DB), an existing knowledge graph can be augmented more efficiently with data that is more relevant through the indexing and ranking of the attributes of data.

Thus, the disclosed knowledge graph augmentation system, method and non-transitory recording medium improves over existing techniques in at least that the disclosed invention takes in an existing knowledge graph along with a corpus of structured data and provides a ranked list of attributes to complement the knowledge graph and relies on the existing knowledge graph and the input corpus and no other source to find attributes that complement the input knowledge through a combination of label, value, and key-value based mappings.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the knowledge graph augmentation system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A method for knowledge graph augmentation, comprising:
   mapping:
      classes from an input of structured data including columns and rows to data in separate structured data including columns and rows;
      attributes in the separate structured data corresponding to the classes in the input of structured data; and
      instances of the classes of the data in the separate structured data and a data string corresponding to the instances;
   indexing semantically similar input data elements corresponding to the attributes for the data string corresponding to the instances of the classes of data by performing computations with the mapped data using at least one of a label-based analysis, a content-based analysis, and an attribute-based clustering as a basis for the computations; and
   ranking the semantically similar input data elements to create a ranked list of attributes to augment the input of structured data and populate with the data string corresponding to the instances,
   wherein the ranking combines a set of filters to refine the ranked list of attributes, the set of filters including:
      a first filter according to column ranges of the columns;
      a second filter according to a column uniqueness of the columns;
      a third filter according to a type of data in a column of the columns;
      a fourth filter according to a distribution of values in the columns.

2. The method of claim 1, further comprising clustering, via a graph clustering algorithm, the semantically similar data elements into sets of attributes with a same semantic intention.

3. The method of claim 1, wherein the ranking comprises a coherence ranking of the attributes of the semantically similar input data elements.

4. The method of claim 3, wherein the ranking further comprises ranking, via a page-ranking analysis, the semantically similar input data elements.

5. The method of claim 1, wherein the ranking comprises a consistency ranking of the attributes of the semantically similar input data elements.

6. The method of claim 5, wherein the ranking further comprises ranking, via a page-ranking analysis, the semantically similar input data elements.

7. The method of claim 1, wherein the ranking comprises a class-based ranking of the attributes of the semantically similar input data elements.

8. The method of claim 1, wherein the ranking comprises at least two of a coherence ranking of the attributes, a consistency ranking of the attributes, and a class-based ranking of the attributes, thereby to create a plurality of ranked lists of the semantically similar input data elements.

9. The method of claim 1, wherein the ranking comprises a coherence ranking of the attributes, a consistency ranking of the attributes, and a class-based ranking of the attributes, to create a plurality of ranked lists.

10. The method of claim 9, further comprising merging the plurality of ranked lists into a single ranked list.

11. The method of claim 1, wherein the indexing indexes the semantically similar input data elements by performing computations with at least two of the label-based analysis, a content-based analysis, and an attribute-based clustering as a basis for the computations.

12. The method of claim 1, wherein the indexing indexes the semantically similar input data elements by performing computations with a label-based analysis, a content-based analysis, and an attribute-based clustering as a basis for the computations.

13. The method of claim 1, wherein the ranking further comprises ranking, via a page-ranking analysis, the semantically similar input data elements.

14. The method of claim 1, wherein the ranking further comprises ranking the semantically similar input data elements by performing computations via a page-ranking analysis combined with at least one of a coherence ranking of the attributes, a consistency ranking of the attributes, and a class-based ranking of the attributes as a basis for the computations via the page-ranking analysis.

15. The method of claim 1, wherein the ranking further comprises ranking, via a page-ranking analysis, the semantically similar input data elements,
   wherein the page-ranking analysis is based on a publication date of the page.

16. The method of claim 1, wherein the ranking further comprises ranking, via a page-ranking analysis, the semantically similar input data elements combined with each of a coherence ranking of the attributes, a consistency ranking of the attributes, and a class-based ranking of the attributes.

17. The method of claim 1, wherein the ranking comprises each of:
   a coherence ranking of the attributes of the semantically similar input data elements;
   a consistency ranking of the attributes of the semantically similar input data elements; and
   a class-based ranking of the attributes of the semantically similar input data elements, and
   wherein a maximum measure of trust for a given cluster is used for the ranked list from the coherence ranking, consistency ranking, or the class-based ranking.

18. A non-transitory computer-readable recording medium recording a knowledge graph augmentation program, the program causing a computer to perform:
   mapping:
      classes from an input of structured data to data in separate structured data;
      attributes in the separate structured data corresponding to the classes in the input of structured data; and
      instances of the classes of the data in the separate structured data and a data string corresponding to the instances;
   indexing semantically similar input data elements corresponding to the attributes for the data string corresponding to the instances of the classes of data by performing computations with the mapped data using at least one of a label-based analysis, a content-based analysis, and an attribute-based clustering as a basis for the computations; and ranking the semantically similar input data elements to create a ranked list of attributes to augment the input of structured data and populate with the data string corresponding to the instances, wherein the ranking combines a set of filters to refine the ranked list of attributes, the set of filters including:
   a first filter according to column ranges of the columns;
   a second filter according to a column uniqueness of the columns;
   a third filter according to a type of data in a column of the columns;
   a fourth filter according to a distribution of values in the columns.

19. A system for knowledge graph augmentation, comprising:
   a mapping device configured to map: classes from an input of structured data to data in separate structured data;
      attributes in the separate structured data corresponding to the classes in the input of structured data; and
      instances of the classes of the data in the separate structured data and a data string corresponding to the instances;

an indexing device configured to index semantically similar input data elements corresponding to the attributes for the data string corresponding to the instances of the classes of data by performing computations with the mapped data using at least one of a label-based analysis, a content-based analysis, and an attribute-based clustering as a basis for the computations; and a ranking device configured to rank the semantically similar input data elements to create a ranked list of attributes to augment the input of structured data and populate with the data string corresponding to the instances, wherein the ranking device is further configured to combine a set of filters to refine the ranked list of attributes, the set of filters including:
      a first filter according to column ranges of the columns;
      a second filter according to a column uniqueness of the columns;
      a third filter according to a type of data in a column of the columns;
      a fourth filter according to a distribution of values in the columns.

* * * * *